US012801700B2

(12) United States Patent
Matsumoto

(10) Patent No.: US 12,801,700 B2
(45) Date of Patent: Nov. 17, 2026

(54) SYSTEM AND METHOD FOR DISCOVERING HIT SONGS IN A FOREIGN LANGUAGE AND POPULARIZING THOSE SONGS IN LISTENERS' NATIVE LANGUAGE MUSIC MARKETS

(71) Applicant: KaZang Inc., McLean, VA (US)

(72) Inventor: Gary Matsumoto, McLean, VA (US)

(73) Assignee: KaZang Inc., McLean, VA (US)

( * ) Notice: Subject to any disclaimer, the term of this patent is extended or adjusted under 35 U.S.C. 154(b) by 0 days.

(21) Appl. No.: 19/256,219

(22) Filed: Jul. 1, 2025

(65) Prior Publication Data

US 2025/0378143 A1 Dec. 11, 2025

Related U.S. Application Data

(63) Continuation of application No. 18/270,641, filed as application No. PCT/US2022/011952 on Jan. 11, 2022, now abandoned.

(60) Provisional application No. 63/136,047, filed on Jan. 11, 2021.

(51) Int. Cl.

| | |
|---|---|
| ***G06F 16/00*** | (2019.01) |
| ***G06F 16/638*** | (2019.01) |
| ***G06F 16/68*** | (2019.01) |
| ***G06F 21/10*** | (2013.01) |
| ***G06Q 10/44*** | (2026.01) |

(52) U.S. Cl.

CPC ............ *G06F 21/10* (2013.01); *G06F 16/638* (2019.01); *G06F 16/68* (2019.01); *G06Q 10/44* (2026.01)

(58) Field of Classification Search

CPC ........ G06F 21/10; G06F 16/638; G06F 16/68; G06Q 10/40; G06Q 10/44

See application file for complete search history.

(56) References Cited

U.S. PATENT DOCUMENTS

2011/0281652 A1* 11/2011 Laverdiere ............ G06F 3/0219 345/173
2012/0215330 A1* 8/2012 Perlmuter .......... G06Q 30/0601 700/94
2014/0162695 A1* 6/2014 Jeon ................... G06Q 30/0261 455/456.3
2016/0092559 A1* 3/2016 Lind ................... G06F 3/04817 715/716
2020/0004495 A1* 1/2020 Dundar ................... G06F 3/165

(Continued)

*Primary Examiner* — Paul Kim

(74) *Attorney, Agent, or Firm* — Dhiraj Jindal; PATENT YOGI LLC

(57) ABSTRACT

The system's methodology combines a variety of information and communication technologies (ICT) tied to global immigration patterns—specifically connecting native and expatriate populations—to create a cross-cultural, "fusion music" listening experience. The system will foster this experience by creating music-based social networks that function as feedback loops between native and expatriate communities, generating crowd-sourced 'music intelligence'—a means to identify hit songs in listeners' native languages and the promote, and accelerate, the popularity of these songs overseas in myriad foreign-language music markets. To promote songs worldwide, the system will track streams and rank songs (and podcasts) by the number of times listeners stream them, concurrently and asynchronously, on native and foreign-language platforms, and in a multiplicity of languages.

11 Claims, 15 Drawing Sheets

(56) References Cited

U.S. PATENT DOCUMENTS

| | | | | |
|---|---|---|---|---|
| 2021/0141592 | A1* | 5/2021 | Reese | G06F 3/165 |
| 2022/0300567 | A1* | 9/2022 | Paul | G06Q 10/44 |

* cited by examiner

Continue to FIG. 1B

FIG. 2B
33
Melon songs 4
Started
Call This Love
수안 (Swan)
Melon
Call This Love
수안 (Swan)
Melon
Melon
2020 년 8월, 현재의 로시
(Rothy) 를 소개합니다
Melon

SYSTEM AND METHOD FOR DISCOVERING HIT SONGS IN A FOREIGN LANGUAGE AND POPULARIZING THOSE SONGS IN LISTENERS' NATIVE LANGUAGE MUSIC MARKETS

REFERENCE TO THE RELATED PATENT APPLICATION

The present application is a continuation application of U.S. patent application Ser. No. 18/270,641, filed on Jun. 30, 2023, and entitled "SYSTEM AND METHOD FOR DISCOVERING HIT SONGS IN A FOREIGN LANGUAGE AND POPULARIZING THOSE SONGS IN LISTENERS' NATIVE LANGUAGE MUSIC MARKETS", which in turn is a national phase application of international patent application No. PCT/US2022/011952 filed on Jan. 11, 2022 and entitled "A SYSTEM AND METHOD FOR DISCOVERING HIT SONGS IN A FOREIGN LANGUAGE AND POPULARIZING THOSE SONGS" which in turn claims benefit of U.S. Provisional Application No. 63/136,047 filed on Jan. 11, 2021, and entitled "SYSTEM AND METHOD FOR DISCOVERING HIT SONGS IN A FOREIGN LANGUAGE AND POPULARIZING THOSE SONGS IN LISTENERS' NATIVE LANGUAGE MUSIC MARKETS" each of which is herein incorporated in its entirety.

TECHNICAL FIELD

This subject matter described herein relates to a system and method configured to discover hit songs in foreign languages and promotes them around the world in listeners' native languages, creating a culturally diverse and blended "fusion" music listening experience.

BACKGROUND

The system and method described herein is designed to promote hit music that has been undiscoverable for many listeners because of language barriers. Tracking listener responses to foreign hit songs—in countries where the songs originate—will solve this problem by gathering real-time market intelligence. Data mining on the system's platform will provide information on foreign consumer behavior before it becomes obvious, identifying streaming trends that will aid in forecasting the potential global demand for a song. One core product of this system is data that will become progressively more valuable as the platform's user base achieves scale. Through "crowd" participation in the invention's tracking system, the system will produce novel datasets that will help identify potential worldwide cross-over hits at earlier stages. The transnational streaming data will not only assist recorded music companies, the data also will assist artists in tracking royalties owed to them.

By facilitating the creation of transnational, music-centric social networks that connect native and expatriate populations the system will help introduce new songs into foreign markets, promoting their popularity worldwide, and, in the process, foster culturally diverse 'fusion' music listening experiences.

Many streaming music platforms give listeners access to foreign music catalogues, but do not encourage the discovery of foreign-language songs, nor promote their popularity.

While listeners can search for foreign songs, any search is only as good as its search terms. For example, to discover the number one song in India on English-language streaming music platforms such as Spotify, Amazon Prime Music, or YouTube Music, users must search for the song by name. If users do not know the song's name, they will not find it. Generic searches produce non-specific results.

On one major platform, for example, a December 2020 search for "Top India Hits" or "Top Indian Hits" yielded only one result: "Top Indie Hits"—a user-curated playlist of Indie pop and rock songs that have nothing to do with India. Similarly, a search for "India Number One" is a playlist of U.S. country music star Tim McGraw's number one hits on a playlist called "Indian Outlaw-Dance Mix." A search for "India number ones" produces the album "Indian Summer"—a playlist of jazz trombonist Tommy Dorsey's hits titled: "The Seventeen Number Ones." At the time these searches were performed (Dec. 13, 2020), India's largest streaming music platform, Gaana, showed India's number one song was "Badaami Rang" by Nikk.

There is a similar Catch-22 with recommendation engines. Even the best algorithms produce results based on songs a consumer's existing listening habits. If the user is not already listening to Indian hip-hop, a streaming music platform will not recommend any Indian hip-hop songs.

Streaming music platforms, regardless of their principal language, have not overcome this limitation because of their dependency on listeners' current listening preferences and their research ability and determination to identify hit songs in foreign languages.

For discovering and promoting foreign hit music, the present system solves both Catch-22s, because the platform's recommendation engine will draw not only on the streaming patterns of an individual—or a population of people who share demographic characteristics with the individual (i.e., age, gender, and nationality). The platform's machine-learning algorithms will recommend songs based on streams by a more closely-knit population—an individual's hand-picked social network, created, expressly, to share music-listening experiences.

SUMMARY

The present system overcomes the problems in the industry and includes an auto-updating global database of music listening preferences, and methodology for creating said database. The system is configured to do at least the following: (1) discover songs as they gather popular momentum in indigenous markets; (2) give these songs global exposure in foreign music markets; and, at the same time, and (3) promote their worldwide popularity.

In short, this system is configured to identify trends in one market and facilitate parallel trends in multiple markets, regardless of language.

According to one embodiment, the present system and method, includes creating a user account for a first user on a platform, the user account comprising profile information for the first user, including language preference; creating a social network for the first user, the social network configured to allow the first user to share content with a second user in the social network; linking at least one music streaming account to the first user account; tracking a number of times a media content is streamed by the at least one linked music streaming account of the first user and linked music streaming accounts of other users of the platform; tracking a number of times a media content is streamed by a linked music streaming account of the social network; and displaying a list of trending media content determined from the tracked media content of the social network. The at least one music streaming account is a third-party streaming service linked to the platform and may include a plurality of domestic and foreign streaming accounts (e.g., the foreign streaming account is defined as content presented in languages other than a user's native language) and the trending media content is determined based on a media content's popularity by tracking and tallying the number of times platform users stream content on a plurality of linked domestic and foreign streaming music services.

One technical advantage to the present system and method is that trending media content can be determined in a more efficient, accurate and simplified manner because it is calculated based on data received from linked streaming music services, rather than mining from various social media feeds which involves more processing power and complicated software.

The user interfaces may be a mobile app (e.g., Android and IOS) and a responsive design website.

BRIEF DESCRIPTION OF DRAWINGS

The accompanying drawings constitute a part of this specification and illustrate embodiments that, together with the specification, explain the subject matter.

DETAILED DESCRIPTION

Figure 1A:
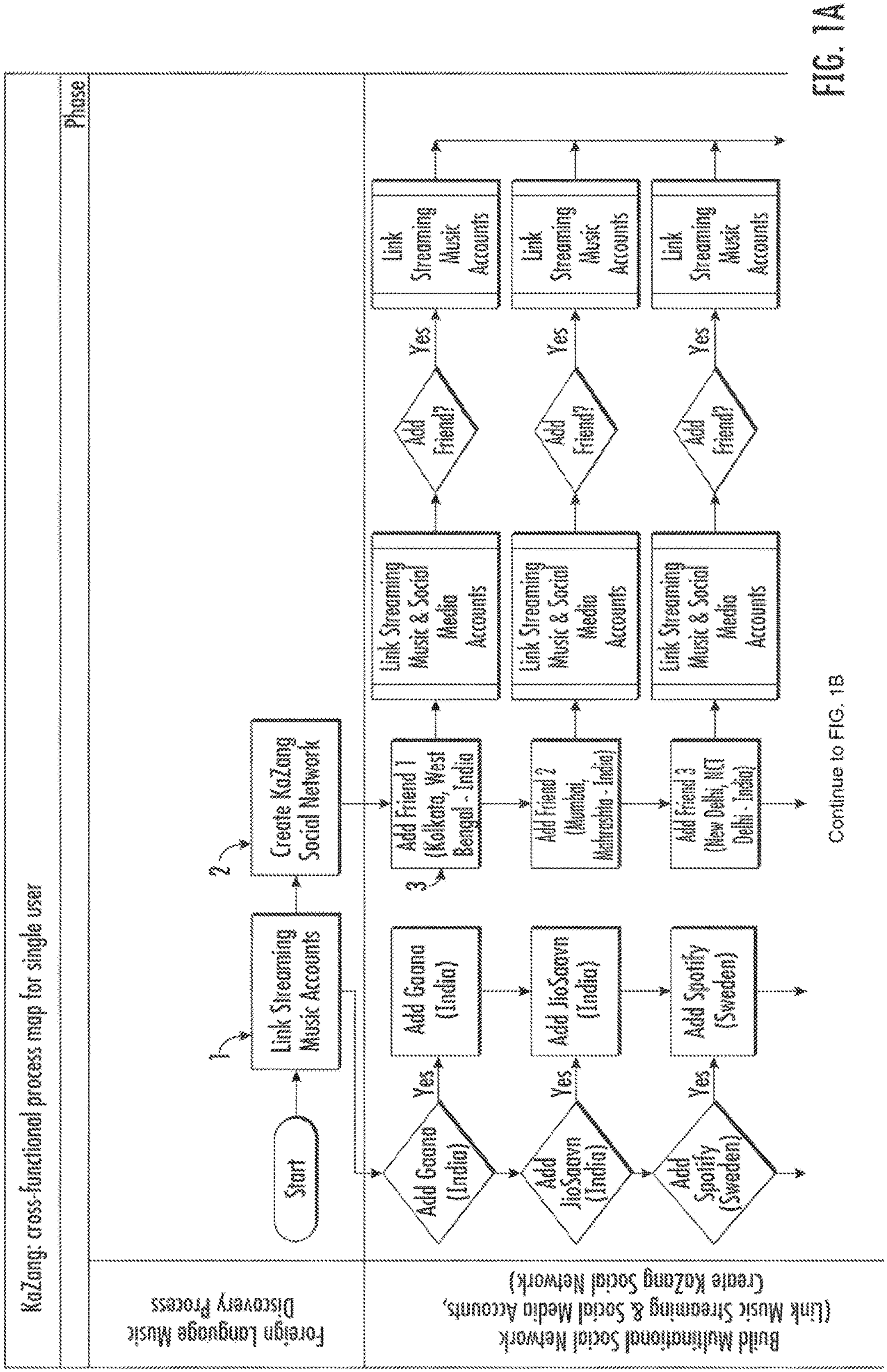
FIGS. 1A-1E shows a cross-functional process map for a single user, e.g., a flow chart depicting a single user's journey on the platform, according to an embodiment.
Figure 1B:
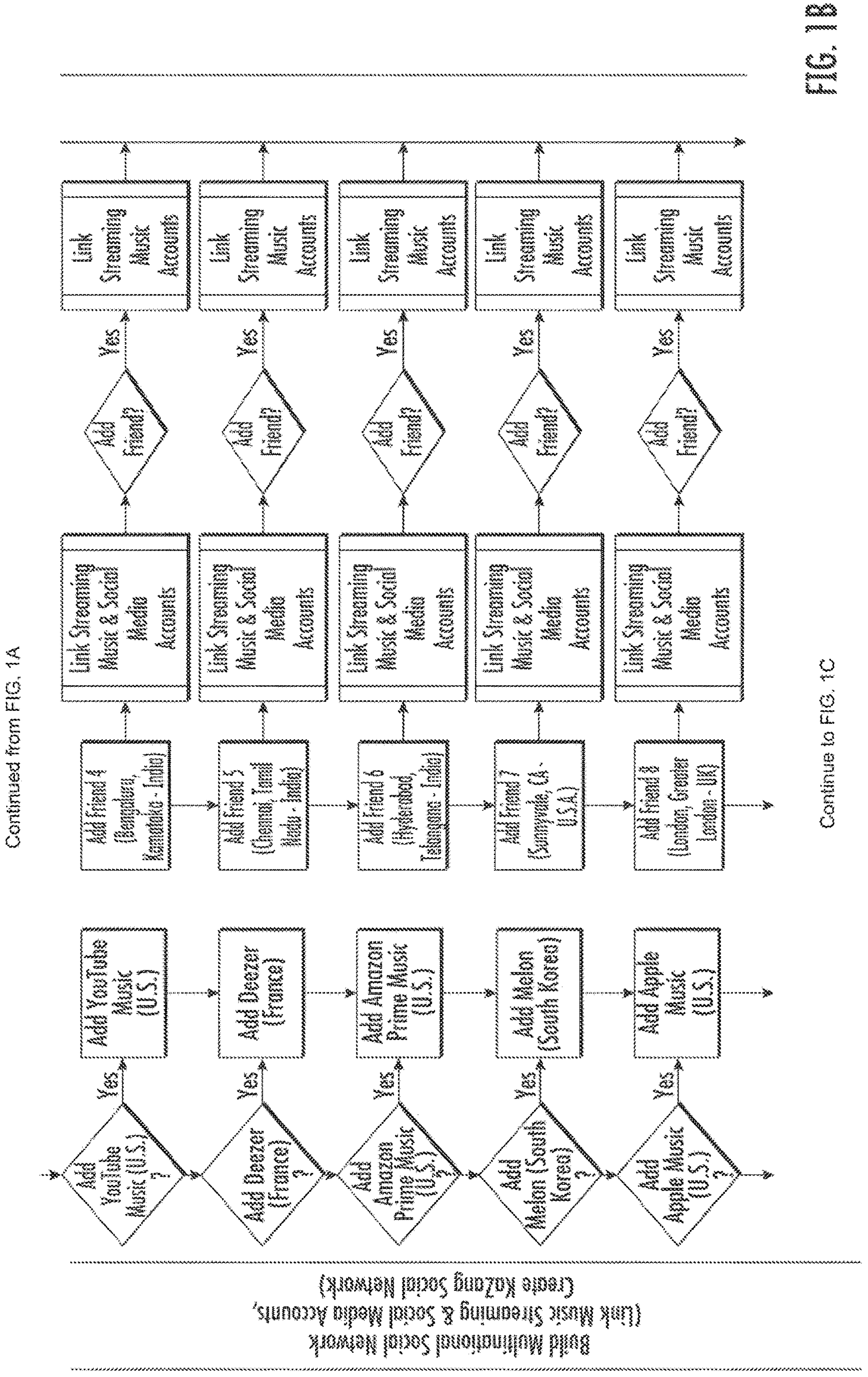
Figure 1C:
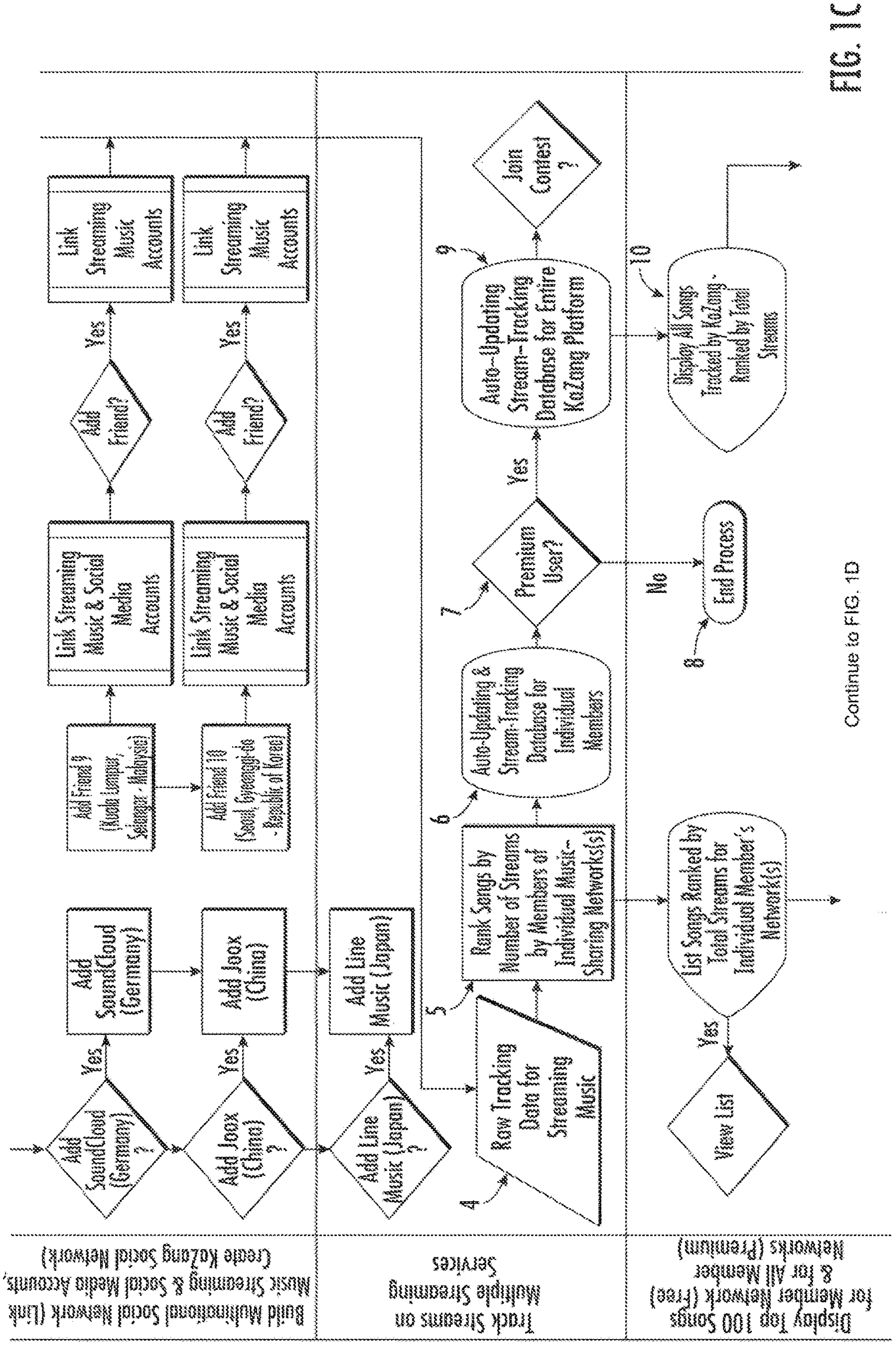
Figure 1D:
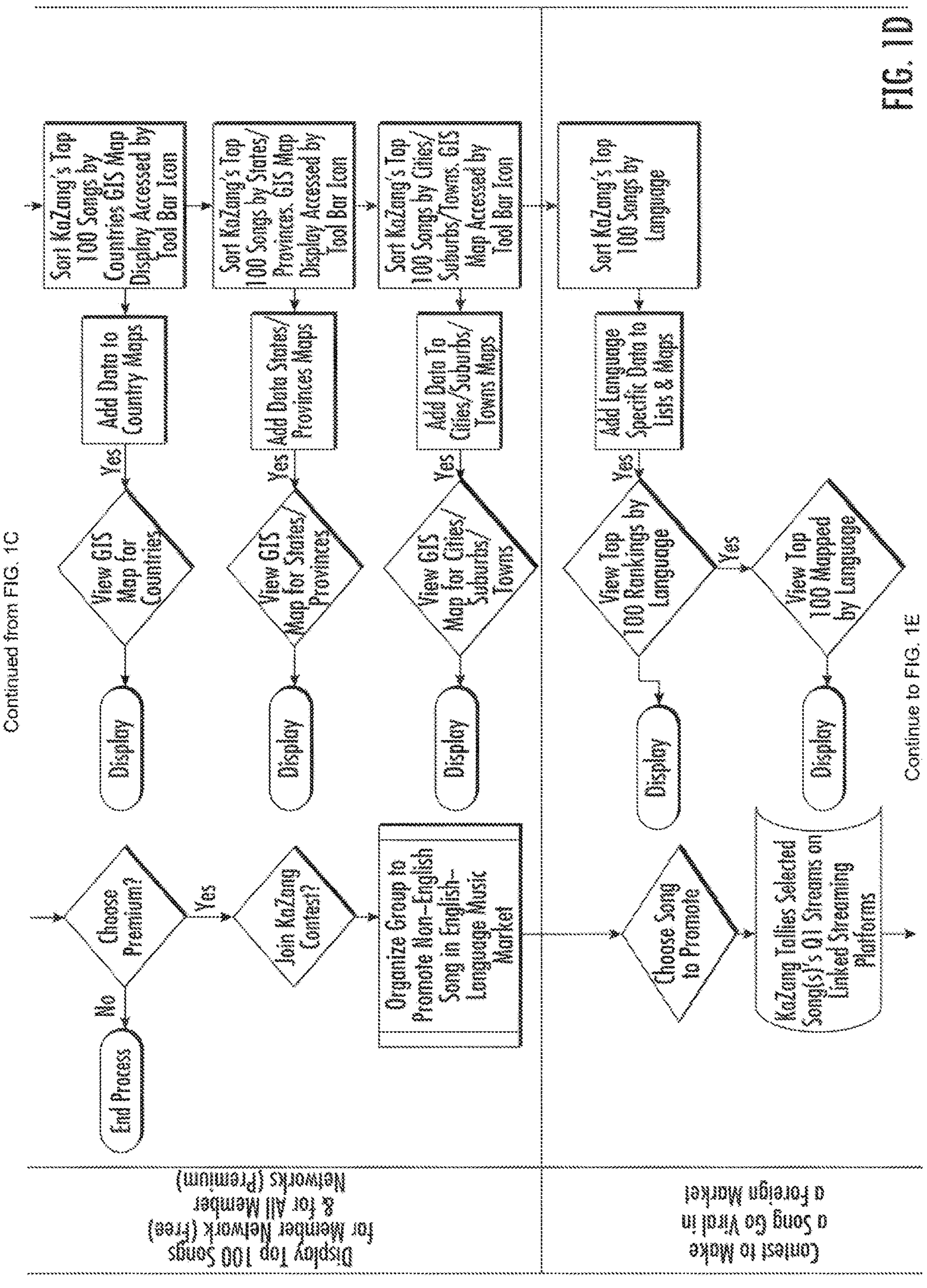
Figure 1E:
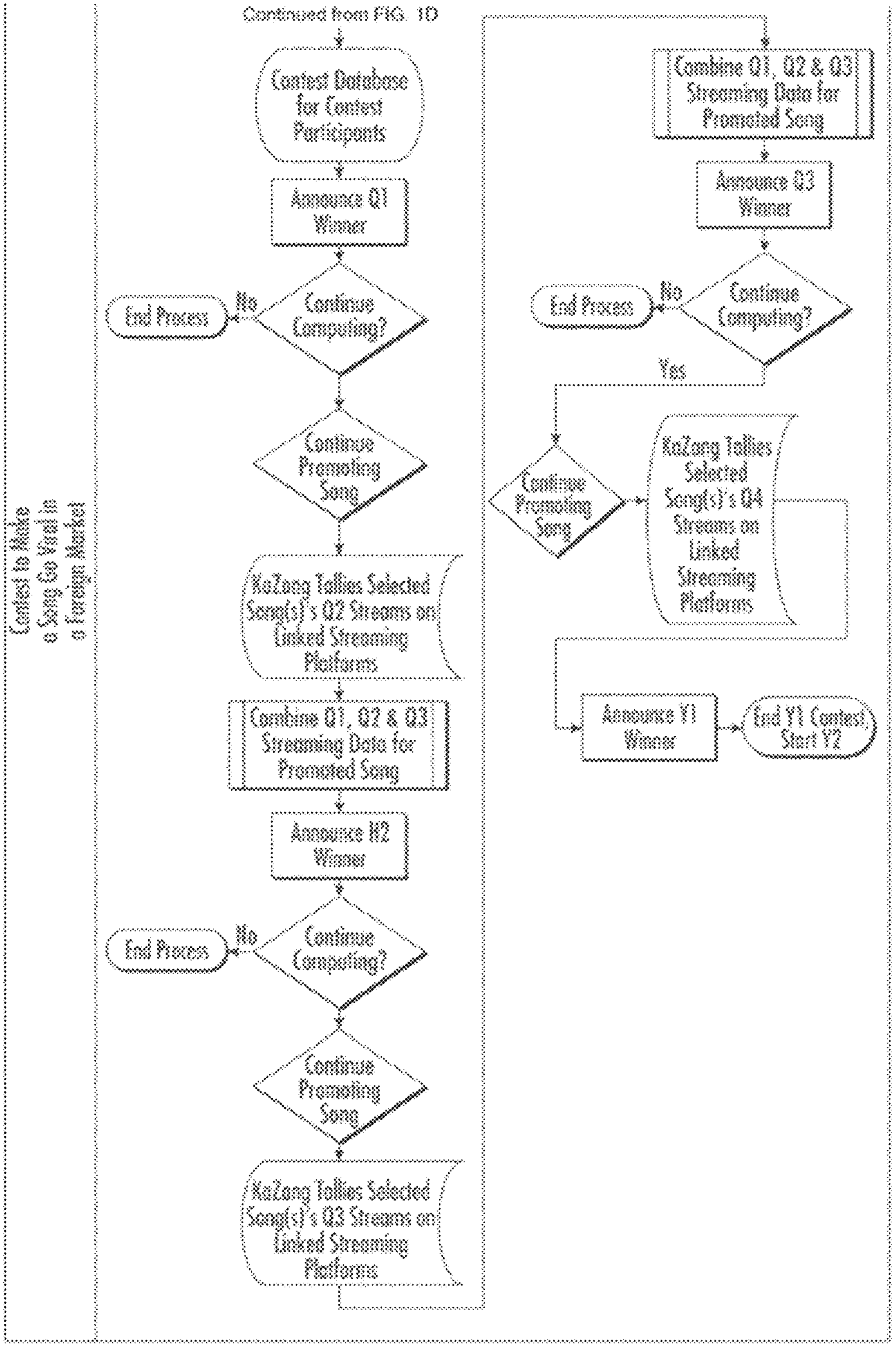

The following detailed description is provided with reference to the figures.

Exemplary embodiments are described to illustrate the disclosure, not to limit its scope, which is defined by the claims. Those of ordinary skill in the art will recognize several equivalent variations in the description that follows without departing from the scope and spirit of the disclosure.

In the restaurant industry, chefs and food critics coined the term "fusion cuisine" to describe dishes that combine the distinctive taste profiles, ingredients, and cooking methods of one country with another's. New York's Cuban Chinese scene and Chicago's Korean-Puerto Rican are examples.

The system and method described below does something similar in music. Direct analogues, for example, include George Harrison's sitar playing on the Beatles song 'Norwegian Wood,' Brian's Jones sitar playing on 'Paint It Black' and the two Paul Simon albums—'Graceland' and 'The Rhythm of the Saints.' On 'Graceland,' Simon blended musical genres associated with specific cultures—i.e., U.S. pop, rock, and R&B with Zulu 'Isicathamiya' and 'Mbaqanga,' and Cajun 'Zydeco.' On 'Rhythm of the Saints,' he blended U.S. styles with Brazilian 'Batucada' and Cameroonian 'Bikutsi.' Fusion proved enormously successful for him. 'Graceland' was Simon's most commercially successful album of his solo career. To date, it has sold an estimated 16,000,000 copies. 'The Rhythm of the Saints' is his third best-selling album.

The system described herein fuses music listening experiences—tapping into current pop culture trends. In the 2010s, foreign artists broke through worldwide in a spectacular way, racking up billions of YouTube views. For example, in December 2020, 'Despacito'—a Spanish-language song by Puerto Rican singer, Luis Fonsi, and rapper Daddy Yankee—was YouTube's most streamed non-English pop video of all time with more than 7.1 billion views (7.6 billion on Jan. 7, 2022). Only 'Baby Shark Dance,' a kid's song in English produced by Pinkfong—South Korea educational entertainment company—has more views (9.9 billion on Jan. 7, 2020). Before 'Despacito,' a 2012 South Korean pop song, 'Gangnam Style,' held YouTube's number one spot. Today, Generation Z kids swoon over South Korea's BTS and Black Pink.

The system and method described herein is designed to fuse social media and mobile technologies, geographic information system software, and innovative social marketing strategies integrated to pursue unprecedented social phenomena, such as popularizing Indian pop, rock, and hip-hop songs in non-Indian markets. This example will relate to India, but the design principles are applicable to other countries, regions, etc. India has the world's second largest population—over 1.3 billion people. India also has the largest expatriate community—an estimated 46.5 million residents located in every nation and territory on Earth. This number swells by nearly 40% to 64.2 million if you include Indian government statistics for "Persons of Indian Origin (PIOs)." India's Ministry of External Affairs (MEA) defines PIOs as: " . . . a foreign citizen who at any time held an Indian passport, or a foreign citizen who or either of their parents/grand parents [sic]/great grand parents [sic] was born or permanently resident in India (or territories that became a part of India" . . . and a foreign citizen "who is a spouse is a citizen of India, or a PIO". Thus, social connections between India's native and expatriate communities are significant and enhanced by the system and method described herein.

India breaks down these populations as follows: 13.5 million "Non-Resident Indians (NRIs)"—i.e., Indian passport holders living overseas, 18.7 million "Persons of Indian Origin (PIOs)"—i.e., a person of Indian original who once held an Indian passport, had parents, grandparents or great grandparents born in India, or is a spouse of an Indian citizen or PIO. The Indian government denies PIO status to people of Indian origin who are citizens of Pakistan, Afghanistan, Bangladesh, China, Iran, Bhutan, Sri Lanka, or Nepal. The ministry also counts 32+ million "Overseas Citizens of India (OCI)." OCIs are naturalized citizens of other countries who have special travel privileges to India because they were once citizens of India, eligible to become Indian citizens, or belonged to a territory that became a part of India or is a child of an Overseas Citizen of India.

With an estimated 200+ million streaming music subscribers, the U.S. and UK record industry considers India one of its hottest future markets. The system described herein is designed to make it hotter, e.g., the Indian diaspora is a demographic engine that could help Indian pop, rock and hip-hop break into Western music charts and become global hits.

The system and method described herein is designed to popularize foreign songs in domestic markets by facilitating the creation of music-focused feedback loops between native and expatriate populations. For example, while K-Pop is well established in Western music markets, crossover hits from South Korea have been limited almost exclusively to BTS and BLACKPINK-a notable exception being PSY's 'Gangnam Style' and 'Gentleman.'

Music-centric social feedback loops between South Korean citizens and their expatriate family and friends will aid the discovery of other South Korean artists.

The native-expatriate music 'intelligence' exchange of the system described herein is also applicable to English-speaking countries, e.g., UK, Canada, Australia, New Zealand, and South Africa—and their expatriate communities.

One of ordinary skill in the art would understand that the system and method of foreign-language music promotion described herein is adaptable to native-expatriate populations of any nation, including Colombia, Brazil, South Africa, Germany, France, Sweden, Mexico, Japan, China, and the United States.

The system and method described herein is configured to be accessible on consumer electronic devices as a mobile app and a responsive design website, e.g., "Music Intelligence." For example, the consumer device may be a mobile device, tablet, computer, or any other structure that supports and incorporates various components of the consumer device, as well as serves as a conduit for electrical and other component connections.

The system and method may comprise one or more of the following features:

a. A proprietary suite of social network-building tools designed to promote cross-cultural exchanges focused on music.
b. A proprietary methodology to discover potential cultural crossover hits through these music-centric social networks that connect native and expatriate populations.
c. A proprietary tracker that will log streams on foreign-language streaming music platforms.
d. A proprietary set of genre-specific, location-specific, and language-specific charts based on data mined from foreign and domestic streaming music services.
e. A proprietary set of interactive maps, displaying streaming music activity around the world.

It is generally understood that as systems with social media components scale (e.g., Facebook, Instagram, Twitter), their chief by-product—data—becomes the product, e.g., data sales to advertisers become a major source of revenue, if not the main source.

The system described herein is configured to mine user data to rank songs, using, for example, the number of streams as a metric. These charts transform the raw data into an 'intelligence product' on a micro and macro scale.

The system is also designed to rank songs for individual social networks, providing each group with their own proprietary chart. The system is designed to collate the data from individual networks to create a platform-wide chart, ranking songs by the number of streams worldwide.

The data will provide a quantitative indicator, tracking a song's growing popularity in one or more markets.

To identify hit songs in foreign-language markets, the system is configured to track streams on foreign-language streaming music services. The system is also designed to collate the data with the number of times a song gets streamed on native-language streaming music platforms.

The combined data, for example, will help listeners identify potential cultural crossover hits in their native countries. As songs gain momentum in their native markets, listeners can then promote them in foreign markets, using the feedback loops created with the system's proprietary suite of social media tools. To maximize the promotion of any given song, users can use every social media, instant messaging, and video platform at their disposal.

The system can also be reversed—promoting English-language hit songs in non-English-speaking music markets. Living in an English-speaking country will expose expatriate populations to hit songs in English. The invention will provide expatriates the means to share information about English-language hits with non-English-speaking friends and family who remain domiciled in expatriates' home countries.

The system's novel methodology for collecting (and creating) actionable music 'intelligence' from foreign-language markets is an early detection system for potential international crossover hits.

Some images related to the system and method described herein are illustrated as examples but are not limited to the iterations described below.

FIGS. 1A-1E show a cross-functional process map for a single user, e.g., a flow chart depicting a single user's journey on the platform, according to an embodiment. The flow chart shows one embodiment that includes three primary decision points after an onboarding sequence. (1) After the onboarding process, the first thing a user must do is link his/her streaming music accounts (e.g., Spotify™, Pandora™, Gaana™, Deezer™, SoundCloud™, etc.) to the invention. For example, the platform is configured to track streams on every service the user links to the platform. Streaming music or streaming audio is a popular way of delivering audio without requiring a user to download files from the Internet. (2) The second thing the user must do is create an ad hoc, proprietary social media network on the platform or service. (3) Each invitee has the option to invite others to join the network. Members of these private networks, for example, can collaborate in building genre-specific (i.e., pop, rock, hip-hop, electronica, trance, funk, jazz, classical, etc.) playlists. Network shares a music listening experience. By recommending songs, network members become shareholders in this communal musical entertainment experience. (4) The system is configured to track the raw streaming data (according to well-known techniques). (5) The system is configured to collate the data and rank songs for each member based on the number of times a member streams a song on streaming music platforms linked to the system through the application programming interfaces (APIs) available from an array of foreign and domestic streaming services, (a linkage established according to well-known techniques). Music genre- and location-specific information, e.g., download, upload locations, may be factors used by the platform to determine rank. The platform may comprise an artificial intelligence (AI) or machine-learning algorithm configured to independently determine genre, relatedness to genre (e.g., determine genre similarities from different regions to increase comparison accuracy), popularity trends, and predict future popular songs and artists, etc. (6) The system is configured to auto-update the steaming data for each member (according to well-known techniques). (7) The system may have a paywall, offering a set of options available, exclusively, to a premium user. (8) If a user rejects a paid (i.e., premium) membership, for example, then a non-premium (free) user will have access to song rankings based on the number of streams by members of their personal networks, according to an embodiment. (9) If a user answers "yes," for example, then a premium membership (i.e., paid subscription) will grant a user access to an auto-updated chart that ranks songs based on the total, cumulative streams by all users—free and premium. (10) The system is configured to display this data in charts and GIS maps accessible to premium users only. (11) The system is configured to sort and collate location data into interactive geographic information systems (GIS) maps that will enable users to access region-specific location and time-tracking data in text, tables, and images (according to well-known techniques). GIS is computer software that analyzes and displays geographically referenced information and uses data that is attached to a unique location. The system will analyze users' geospatial and time-tracking data to identify patterns to indicate and/or predict listening trends in different nations. (12) The system is configured to display location data on users' personal dashboards and the invention's regional and global maps (according to well-known techniques). (13) Next is another decision point. If a non-English pop/rock, hip-hop/rap, etc. song is a hit in a premium user's native language, he or she will have the option to enter a contest to make the song, or songs, go viral in English-speaking music markets. (14) Contest entrants will select one or more songs to promote, using the invention's proprietary suite of messaging and video creation tools, and using other social media platforms. (15) After members make their selections, the system is configured to will track and quantify the number of times the non-English hit song gets streamed in non-English music markets (according to well-known techniques). The contest will also track and quantify the reverse i. the number of a times an English-language hit gets streamed in a non-English language music market (according to well-known techniques). (16) The contest will tally the number of times that promoted songs get streamed (according to well-known techniques). (17) The contest may display real-time auto-updated changes in song rankings or display them weekly or monthly (according to well-known techniques).

Figure 2A:
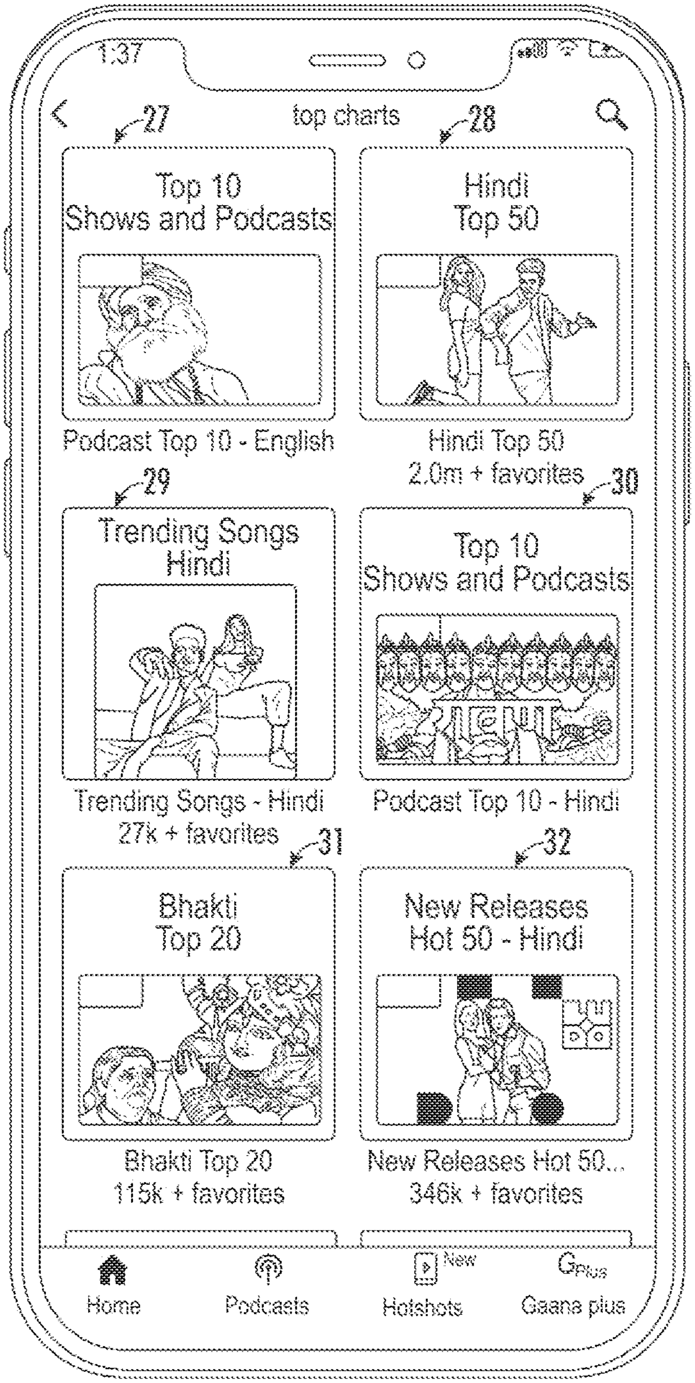
FIG. 2A shows an example of how songs might be displayed on a mobile device when a user/listener browses for songs on Gaana—the most widely used Indian streaming music platform, according to an embodiment.

FIG. 2A shows an example of how songs might be displayed on a mobile device when a user/listener browses for songs on Gaana-Indian streaming music platform, according to an embodiment. It shows icons for various Gaana playlists, including (27) "Top 10 Shows and Podcasts-English"; (28) "Hindi Top 50"; (29) "Trending Songs Hindi"; (30) "Top Shows and Podcasts Hindi"; (31) "Bhakti Top 20"; and (32) "New Releases Hot 50-Hindi".

Figure 2B:
FIG. 2B shows thumbnails for Korean songs on Melon—the most popular South Korean streaming music platform, according to an embodiment.
Figure 3A:
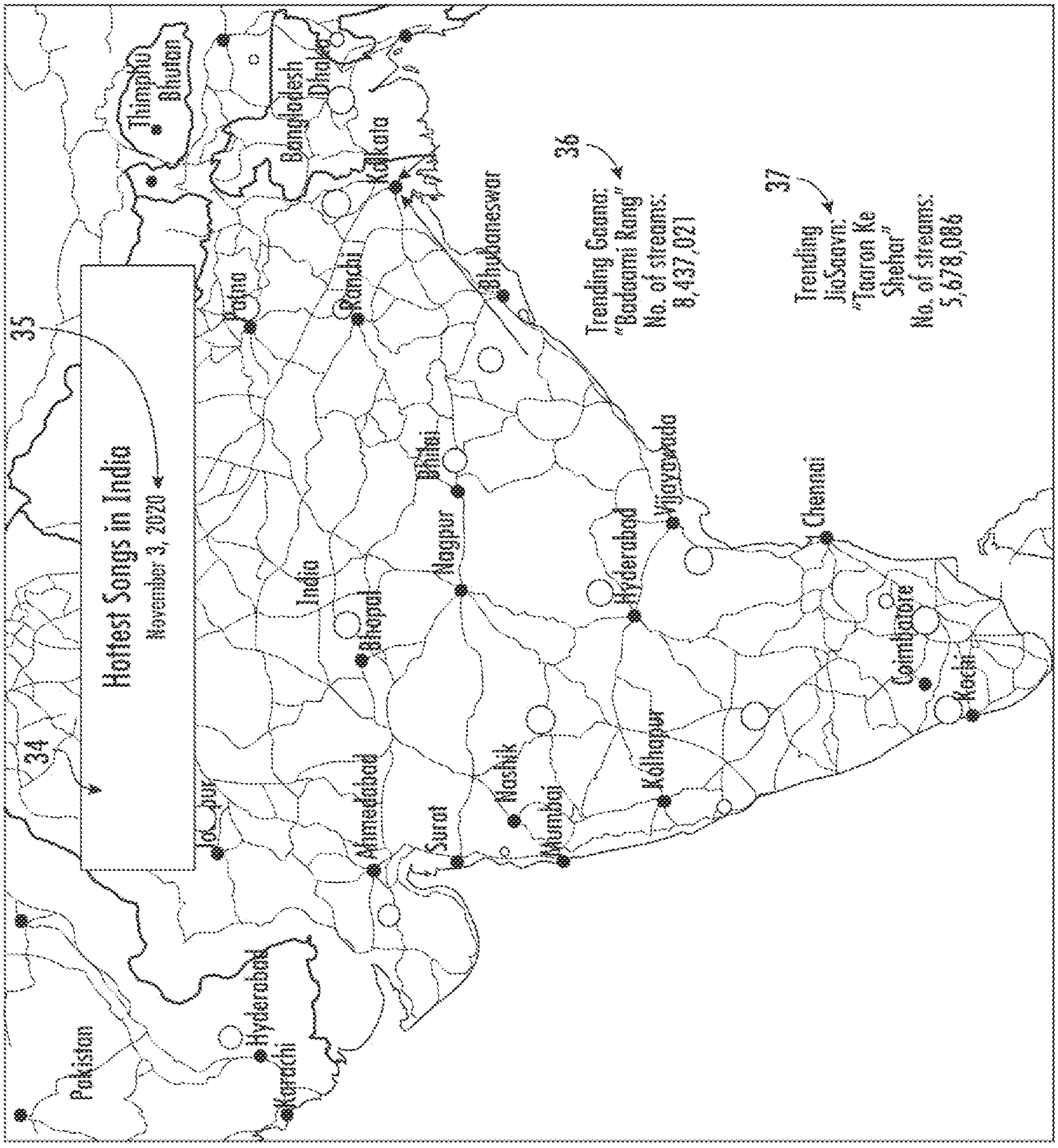
FIG. 3A illustrates how the streaming music tally for India's top songs might be displayed on an auto-updating global map, according to an embodiment.

FIG. 2B shows thumbnails for Korean songs on Melon-South Korean streaming music platform (33), according to an embodiment FIG. 3A illustrates how the streaming music tally for India's top songs might be displayed on an auto-updating global map(s), according to an embodiment. This view (34) shows India. The data is date specific-showing the (35) "Hottest Songs in India" for Nov. 3, 2020. At the bottom right of the screen, the invention displays the names of those songs (36) 'Badaami Rang' with 8,437,021 views on Gaana and (37) 'Taaron Ke Shehar' with 5,678,086 streams on JioSaavn.

Figure 3B:
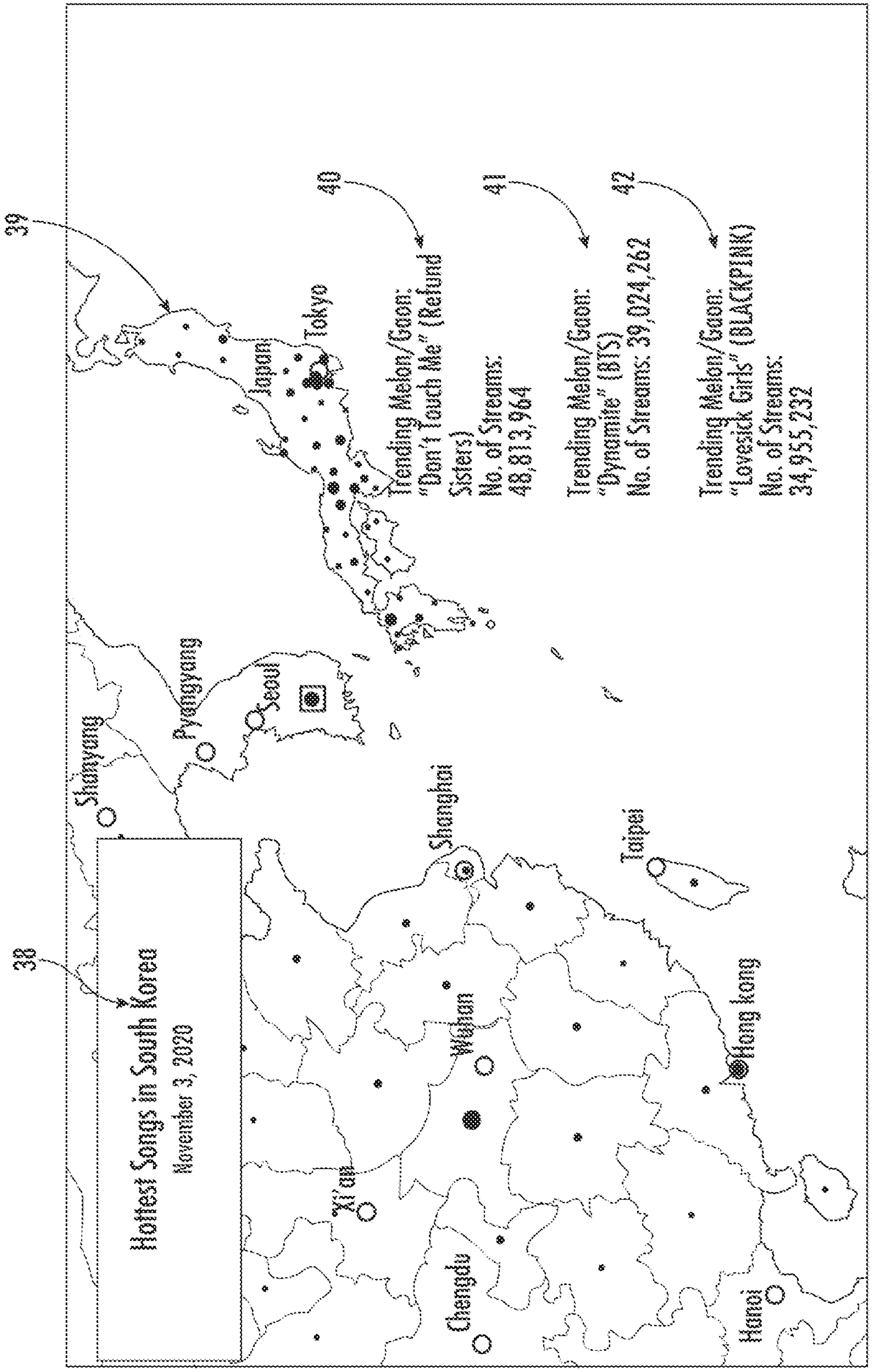
FIG. 3B illustrates how a daily cumulative streaming music tally for South Korea's top songs might be displayed on an auto-updating global map, according to an embodiment

FIG. 3B illustrates how the streaming music tally for South Korea's top songs might be displayed on an auto-updating global map, e.g., for South Korea (38) and Japan (39), according to an embodiment. The data on the right hand of the screen is for the top three songs streamed on Melon-(40) "Don't Touch Me" by the Refund Sisters with 48,813,964 streams, (41) "Dynamite" by BTS with 39,024, 262 streams, and (42) "Lovesick Girls" by BLACKPINK with 34,955,232 streams.

Figure 3C:
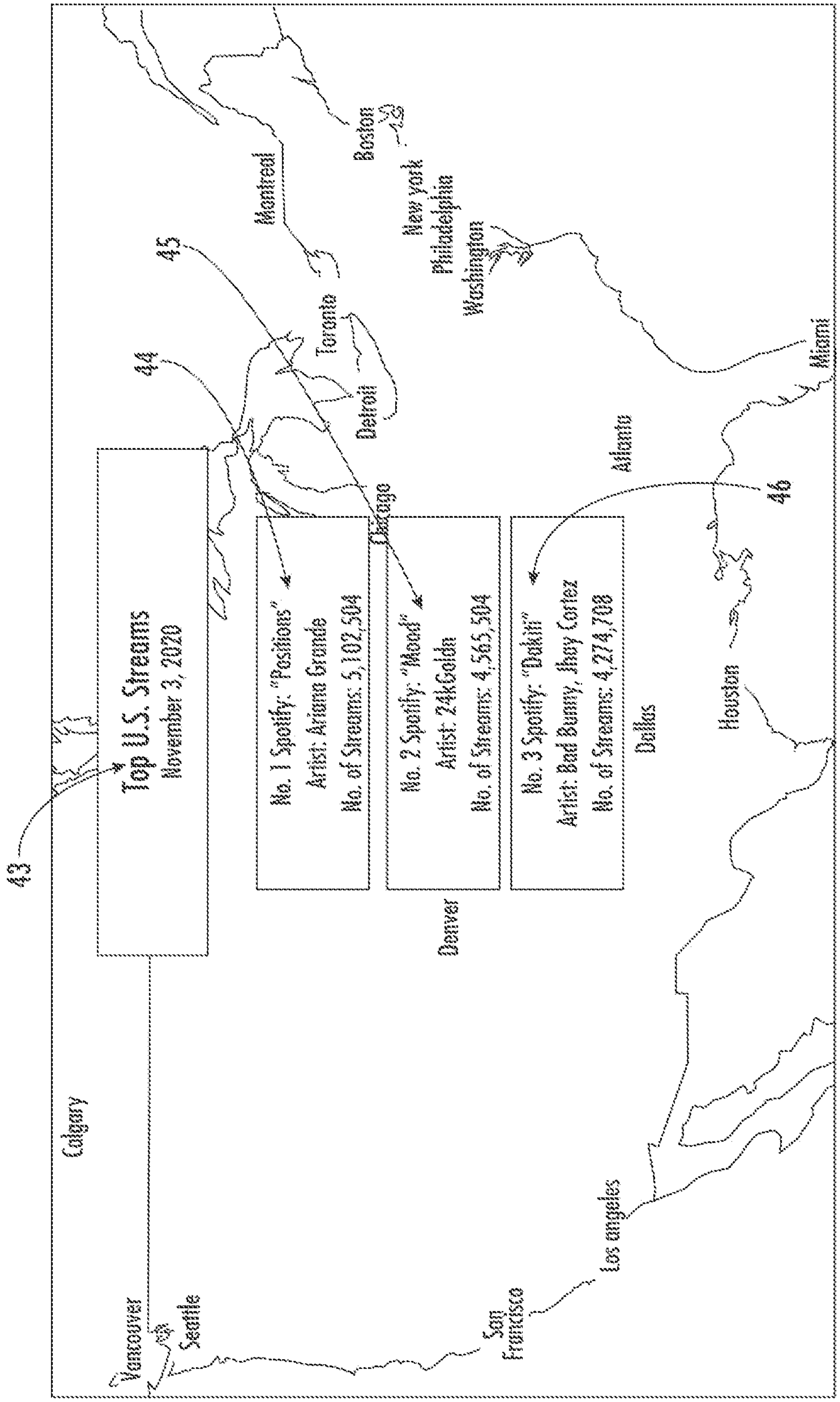
FIG. 3C shows an example of how a daily cumulative streaming music tally for the most-streamed songs in the United States on the system's music sharing platform might be displayed on the system's auto-updating map for the continental United States, according to an embodiment.

FIG. 3C shows how the top three songs streamed in the (43) U.S. on Spotify (on Nov. 3, 2020) might be displayed on the invention's auto-updating map for the continental United States. The data in the center of the screen shows the top three songs streamed on Spotify that day-(44) "Positions" by Ariana Grande with 5,102,504 streams, (45) "Mood" by 24kGoldn with 4,565,504 streams, and (46) "Dakiti" by Bad Bunny and Jhay Cortez with 4,274,780 streams.

Figure 4A:
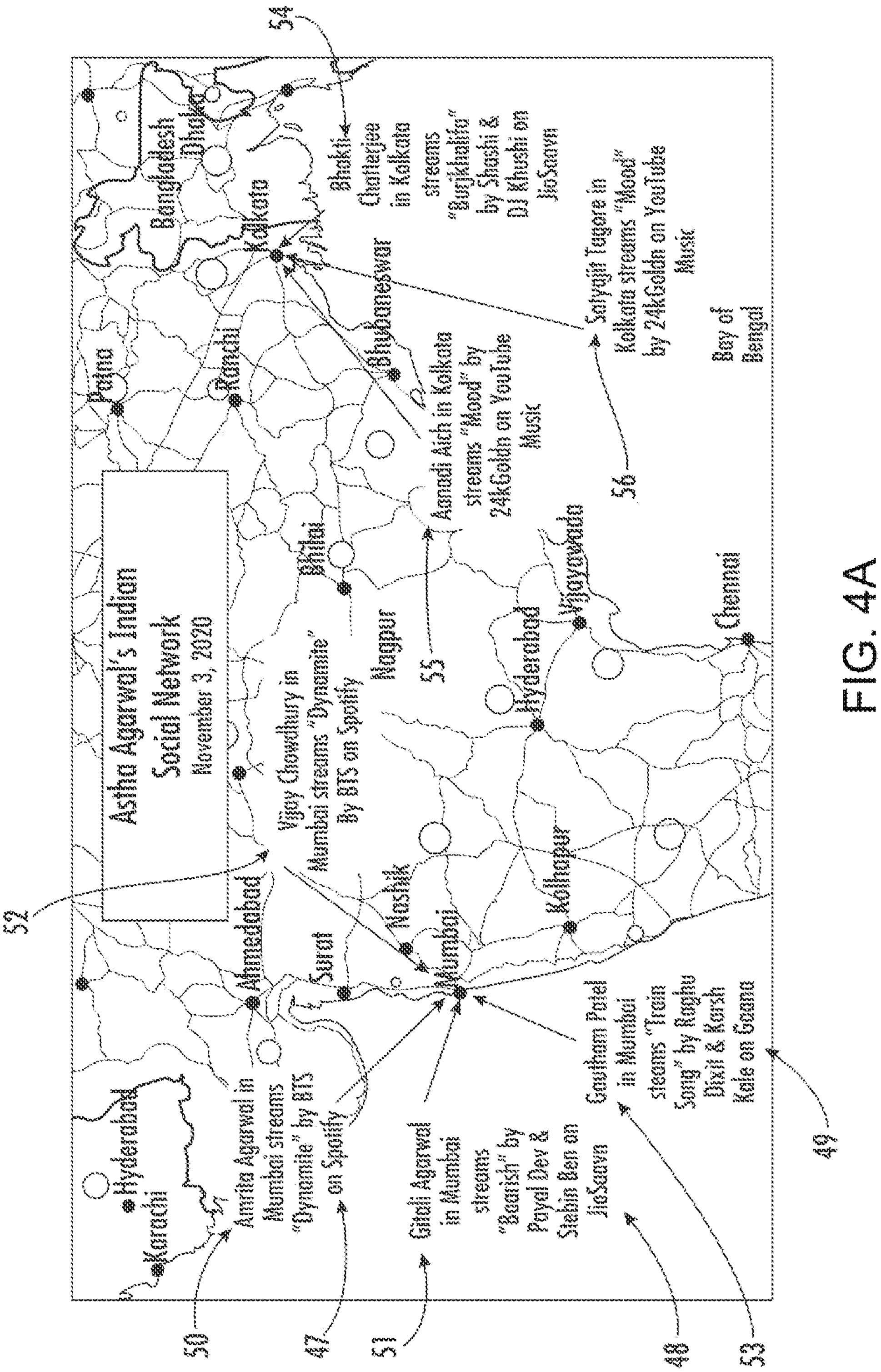
FIG. 4A shows an example of a user's song tracker, according to an embodiment, e.g., when Indian members of a fictional user's (i.e., Astha Agarwal) social music network stream a song using the system, a proprietary auto-updating geospatial and time-tracking map of India displays—in real-time—the name of the song, the location of the stream and the time of day.

FIG. 4A is one example of an iteration of the present system's song tracker for a fictional user, "Astha Agarwal." ("User A"). When India-based members of User A's hand-picked music network stream a song using the invention, a proprietary auto-updating map of India displays in real-time the name of the song, the location of the stream, the time of day, and (47, 48, 49) the name of streaming service. Members of User A's music network are also fictional. As you might surmise, at least two members of User A's network are projected to be relatives: (50) "Amrita Agarwal" in Mumbai is streaming 'Dynamite' by BTS on Spotify, and (51) "Gitali Agarwal," also in Mumbai, is streaming 'Baarish' by Payal Dev & Stebin Ben on JioSaavn. Other members of Astha's Indian music network include (52) "Vijay Chowdhury" in Mumbai who is streaming 'Dynamite' by BTS on Spotify, (53) "Gautham Patel" in Mumbai who is streaming 'Train Song' by Raghu Dixit and Karsh Kale on Gaana; (54) "Bhakti Chatteijee" in Kolkata who is streaming 'BuijKhalifa' by Shashi and DJ Khushi, (55) "Aanadi Aich" in Kolkata who is streaming 'Mood' by 24kGoldn on YouTube Music, (56) and "Satyajit Tagore," also in Kolkata who is also streaming 'Mood' by 24kGoldn on YouTube Music.

Figure 4B:
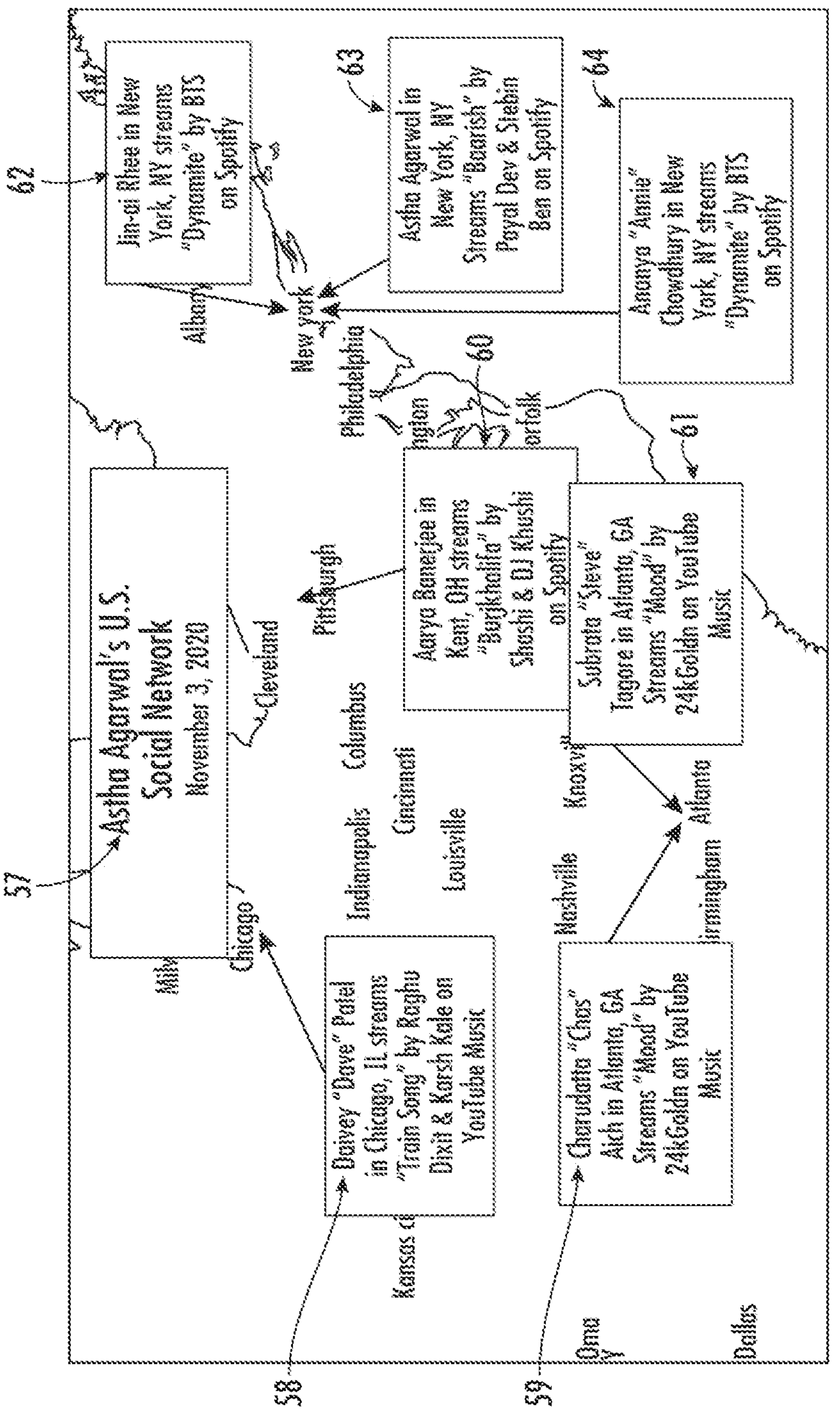
FIG. 4B shows an example of how, in real-time, the songs being streamed by members of a fictional user's (e.g., Astha Agarwal) U.S.-based network, according to an embodiment.

FIG. 4B shows—in real-time—the songs being streamed by U.S.-based members of (57) User A's music network, according to an embodiment. The map shows the eastern half of the United States where User A's fictional friends live. They include (58) "Daivey Patel" in Chicago, Illinoi who is streaming 'Train Song' by Raghu Dixit & Karsh Kale on YouTube Music; (59) "Charudatta Aich" in Atlanta, Georgia who is streaming 'Mood' by 24kGoldn on YouTube Music; (60) Aarya Bannerjee" in Kent, Ohio who is streaming 'Buijkhalifa' by Shashi & DJ Khushi on Spotify; (61) "Subrata Tagore" in Atlanta, Georgia who is streaming 'Mood' by 24kGoldn on YouTube Music; (62) "Jin-ai Rhee" in New York, NY who is streaming 'Dynamite' by BTS on Spotify; (63) "Astha Agarwal"—the user who created this music network—in New York, NY who is streaming 'Baarish' by Payal Dev & Stebin Ben on Spotify; and (64) "Ananya Chowdhury" in New York, NY who is streaming 'Dynamite' by BTS on Spotify.

Figure 5A:
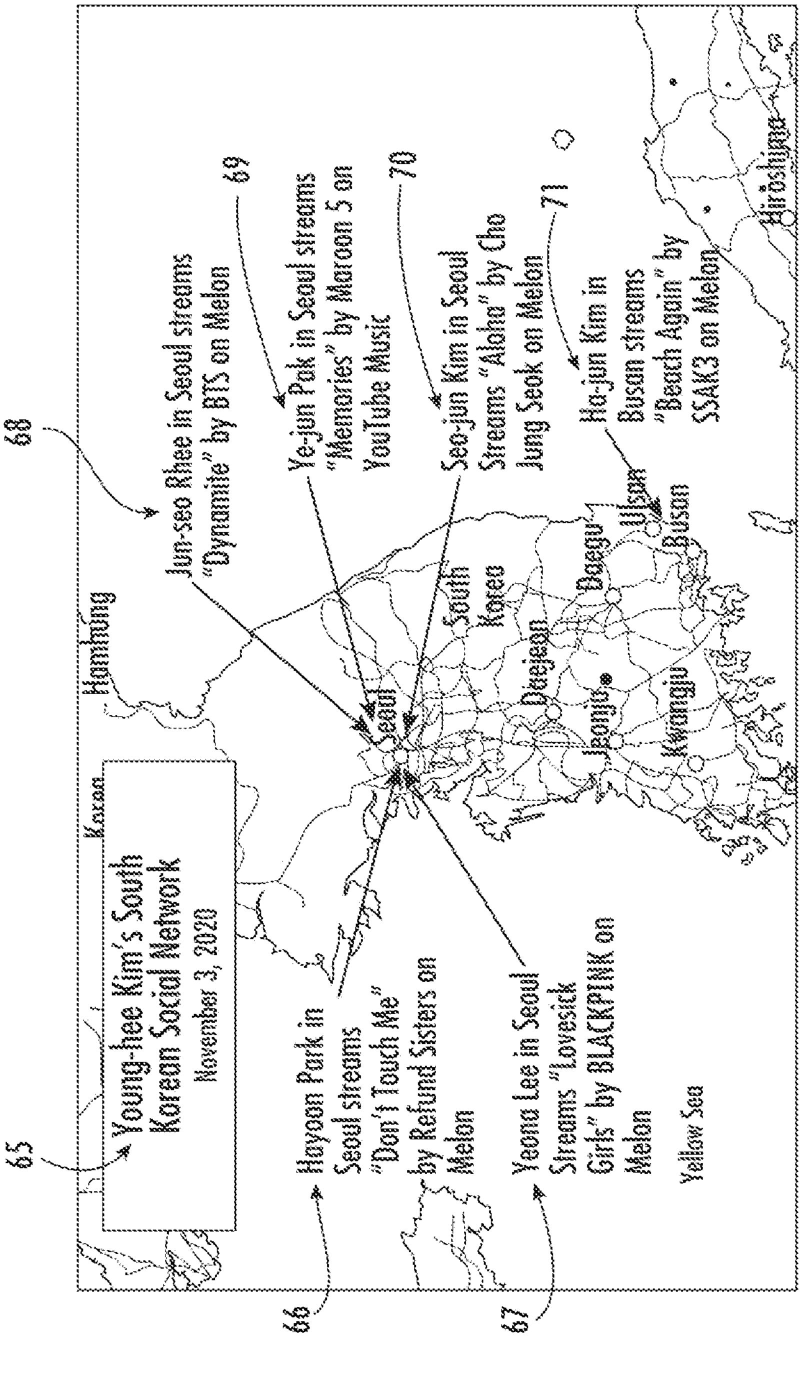
FIG. 5A shows an example of a user's song tracker, according to an embodiment iteration for a fictional user, (e.g., Young-hee Kim). When South Korean members of her social network stream a song using the invention, a proprietary, auto-updating map of South Korea displays—in real-time—the name of the song, the location of the stream and the time of day.

FIG. 5A is an example of a possible iteration of the song tracker for fictional Korean American user, Young-hee Kim ("User B"), according to an embodiment. This illustration shows (65) the auto-updating, country-specific map of South Korea and what fictional members of User B's music network are streaming. They include (66) "Hayoon Park" in Seoul who is streaming 'Don't' Touch Me' by Refund Sisters on Melon; (67) "Yeona Lee" in Seoul who is streaming 'Lovesick Girls' by BLACKPINK on Melon; (68) "Junseo Rhee" in Seoul who is streaming 'Dynamite' by BTS on Melon; (69) "Ye-jun Pak" in Seoul who is streaming 'Memories' by Maroon 5 on YouTube Music; (70) Seo-jun Kim in Seoul who is streaming 'Aloha' by Cho Jung Seok on Melon; and (71) "Ha-jun Kim" in Busan who is streaming 'Beach Again' by SSAK3 on Melon.

Figure 5B:
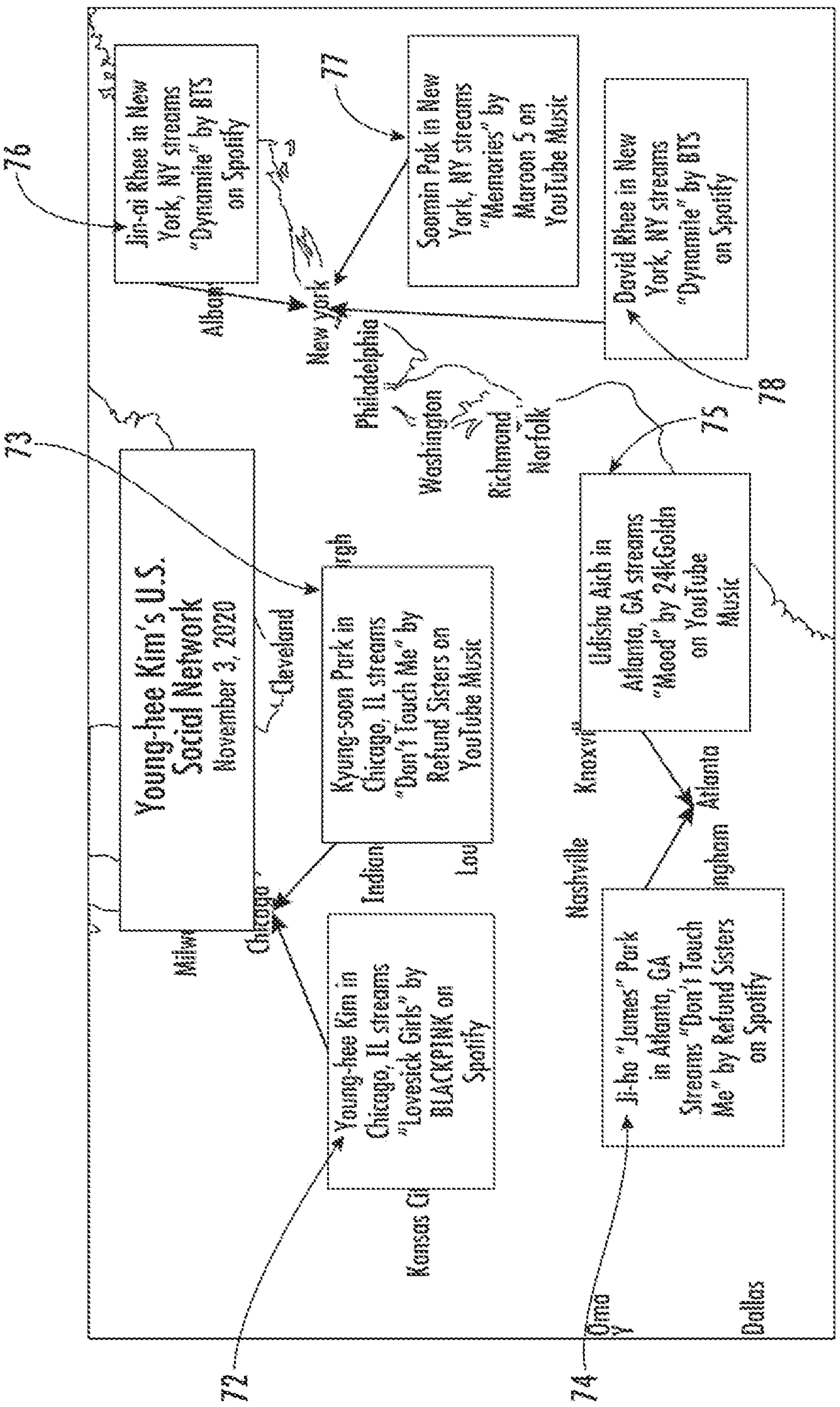
FIG. 5B shows an example of a U.S. geographic information systems (GIS) map, displaying the real-time listening activity of U.S. members of fictional user Young-hee Kim's social music network, according to an embodiment.

FIG. 5B shows the real-time listening activity of U.S.-based members of User B's social music network, according to an embodiment. The creator of this fictional network, (72) User B, lives in Chicago. For this reason, we expect most of User B's friends will live in the eastern half of the United States, as is the case with our fictional Indian American (or Indian expatriate) user who lives in New York (User A). In this example, User B's music network includes (73) "Kyung-Soon Park" in Chicago, who is streaming 'Don't Touch Me' by the Refund Sisters on YouTube Music; (74) "Ji-Ho Park" in Atlanta, Georgia who is streaming 'Don't Touch Me' by the Refund Sisters on Spotify; (75) "Udisha Aich" in Atlanta, Georgia, who is streaming 'Mood' by 24kGoldn; (76) Jin-Ai Rhee" in New York, NY, who is streaming 'Dynamite' by BTS on Spotify; (77) "Soomin Pak" in New York, NY, who is streaming 'Memories' by Maroon 5 on YouTube Music; and (78) "David Rhee" in New York, NY, who is streaming 'Dynamite' by BTS on Spotify.

Map views are configured to auto-adjust to fit the size of a user's screen. Users can use the two-fingered 'pinch' method, for example, to zoom in and out.

Figure 6:
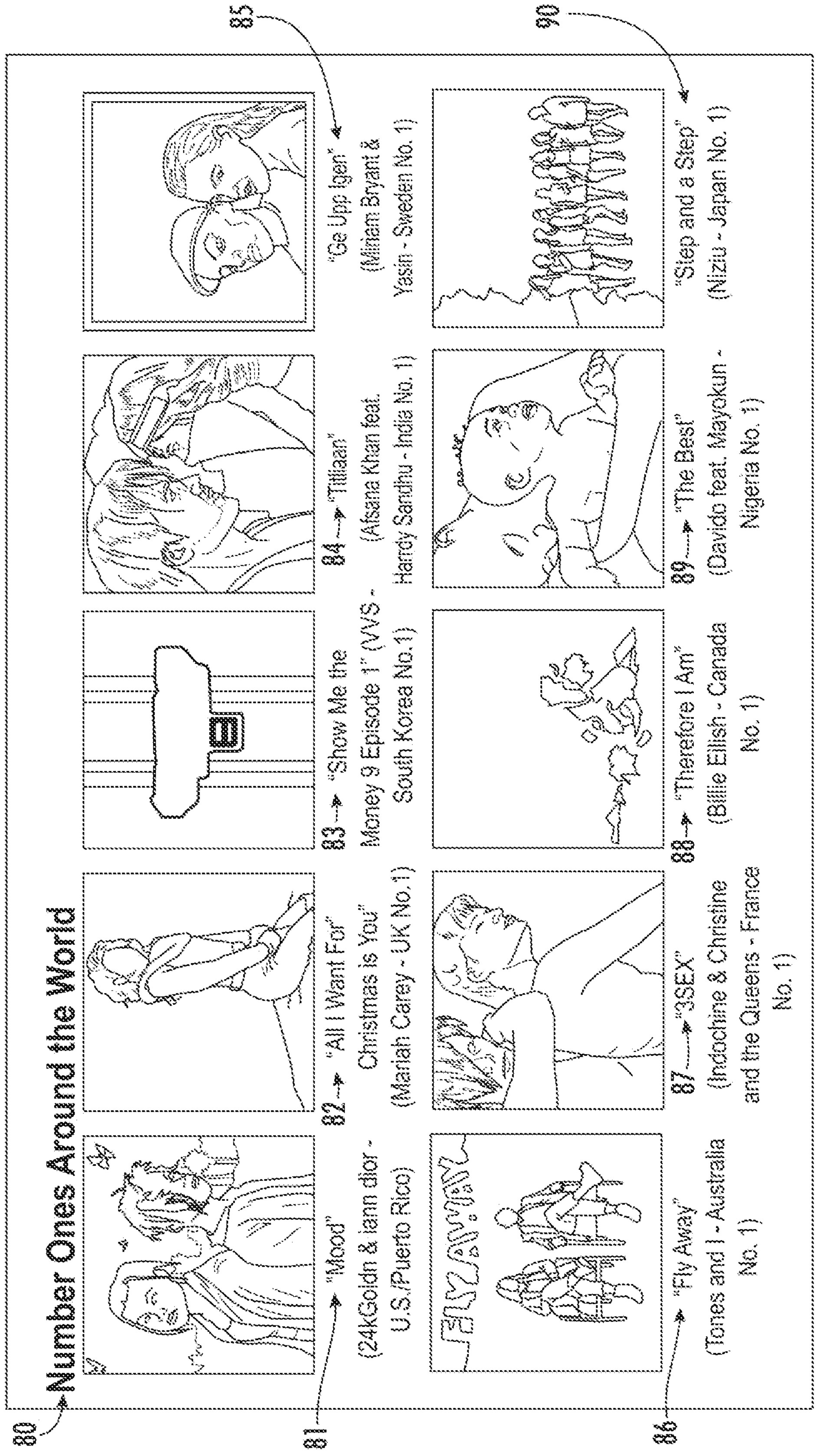
FIG. 6 illustrates how a list of "Number One Songs from Around the World" might be displayed on a system page or dashboard, according to an embodiment. It is an example of how the system's recommendation engine might introduce global audiences to the No. 1 songs in any genre from music markets around the world, mingling foreign and domestic hits. The album thumbnails represent the most-streamed songs on any given day, thereby promoting a fusion music listening experience, according to an embodiment. This illustration provides a possible frill-screen view on a responsive-design website or Roku.

FIG. 6 illustrates how the system is configured to introduce global audiences to No. 1 songs from music markets around the world (80) to promote a 'fusion music' listening experience, according to an embodiment. This is a possible full-screen view for a responsive design website and Roku. There are 10 album thumbnails in this view, showing the No. 1 songs in 10 countries—(81) United States: 'Mood' by 24kGoldn; (82) UK No. 1: 'All I Want for Christmas is You' by Mariah Carey; (83) South Korea No. 1: 'Show Me the Money9 Episode' by VVS; (84) India No. 1: 'Titliaan' by Afsana Khan, feat. Harrdy Sandhu; (85) Sweden No. 1: 'Ge Upp Igen' by Miriam Bryant & Yasin; (86) Australia No. 1: 'Fly Away' by Tones and me; (87) France No. 1 '3SEX' by Indochine & Christine and the Queens; (88) Canada No. 1: 'Therefore I am by Billie Eilish; (89) Nigeria No. 1: 'The Best' by DaVido feat. Mayokun; (90) Japan No. 1: 'Step and a Step' by NiziU. Similarly, although now illustrated herein, the system may be configured introduce global audiences to hit foreign and domestic Pop/Rock songs or Hip-Hop songs from around the world, e.g., to promote a "fusion music" listening experience.

The following is a non-limiting example of a single user experience using the system. Some, or all, the steps may be included in the same or different order.

A user is prompted to create an 'in-app' profile, using a top-of-screen drop-down menu that includes, e.g., selections for Account, Profile, Languages, Settings, and Log Out. The user will then create an 'in-app' KaZang social network to share music with friends who live in the same country or abroad. One characteristic of these networks is shared ethnicity. This platform is designed to foster music-centered communication between natives of a country and its expatriates. Through native/expatriate feedback loops, network members can discover the latest hit songs in different languages, see what members of their social network are streaming on their respective streaming music services. This "music intelligence" may encourage network members residing in different countries to sample a song, or songs. The system/UI may be configured to allow the user to see what members of the user's KaZang social network are streaming on an auto-updating feed, e.g., like Twitter™ feed, or on geographic information systems (GIS) maps. The user may allow members of 'in-app' social network (or those outside network) to know the following information about the user's streaming activity: a) name of song user is streaming; b) date and time of day that user streams a song; and c) user location when streaming a song.

The system/UI may be configured to allow a user to view (e.g., top of home screen) users' social network Top 10 list of trending songs, autopopulated and ranked based on number of streams by network members. The system/UI may also be configured to allow a user to view user's social network's trending songs, autopopulated and categorized, according to genre, including, for example: a) pop, b) rock, c) hip-hop, d) reggaeton, e) electronica, and g) classical.

The system/UI may be configured to allow a user to scroll down/swipe down to see the various categories. In portrait mode, each category may feature at least two thumbnails (corresponding to the width of a smartphone screen) under each heading. In landscape mode, the system/UI may present rows of thumbnails that users can scroll through. Each row may include at least ten thumbnails. Each thumbnail may be an iFrame that users can click to stream a song.

Streams will occur on users' selected music streaming platforms (e.g., YouTube Music, Spotify, Amazon Music, Gaana, Jiosaavn, Melon, Apple Music, Deezer, etc.). For example, the first row of thumbnails may be the Top 10 songs (by number of streams by platform members-anywhere in the world regardless of genre-on that day. The second row may be the Top 10 songs in the country where the user resides. The third row may be the Top 10 songs in an expatriate user's native country. The fourth row may start a series of rows organized by music genre. The fifth row may be the Top 25 in rock. The sixth row may be the Top 25 in hip-hop. The seventh row may be the Top 25 in reggaeton. The eighth row may be the Top 25 in electronica. The ninth row may be the Top 25 in "house, techno, trance." The tenth row may be the Top 10 songs in countries or regions that interest a user.

One row could also be a category of music not included in the platform's main popular music categories (e.g., classical, jazz, Bollywood, Bhangra, Bengali, Afro Pop, Kwaito, etc.).

The system/UI may be configured to allow a user to leave a comment in a comment section for each song, viewable by others inside or outside the user's KaZang social network.

The system/UI may be configured to track each song and number of times platform users stream it on any streaming service anywhere in the world, and for user to (a) view a daily list of songs ranked by the number of times each song is streamed by members of the user's personal social network, (b) view a weekly list of songs ranked by the number of times each song is streamed by members of the user's personal social network, (c) view a monthly list of songs ranked by the number of times each song is streamed by the user's personal social network, (d) view an annual list of songs ranked by the number of times each song is streamed by members of the user's personal social network in any given year.

The system may be configured to allow a user to instant message (IM) Zdirect message (DM) members inside or outside of the user's personal social network using, e.g., an "in-app" instant messenger that also permits users to share photos, messages, short videos.

The system/UI may be configured to (a) allow a user to view lists of trending songs in the countries where members of the user's KaZang social network reside, (b) switch between country-specific lists of trending songs (in user's social network only) by tapping a single buttonZarrow, (c) allow, for example, an Indian user to IM members of their social network—in Punjabi or English/in Hindi or English—using an 'in-app' instant messenger, (d) allow Latin America user to IM members of their social network—in Spanish or English ii. using an 'in-app' instant messenger, (e) South Korean user to IM members of their social network—in Korean or English—using an 'in-app' instant messenger, (f) South African user to IM members of their social network—in Zulu or English—using an 'in-app' instant messenger, (g) Brazilian user to IM members of their social network—in Portuguese or English—using an 'in-app' instant messenger, (h) French user, to IM members of their social network—in French or English—using an 'in-app' instant messenger, (i) German user to IM members of their social network—in German or English—using an 'in-app' instant messenger, (j) Italian user to IM members of their social network—in Italian or English—using an 'in-app' instant messenger, (k) Swedish user to IM members of their social network—in Swedish or English—using an 'in-app' instant messenger, (l) Japanese user to IM members of their social network—in Japanese or English—using an 'in-app' instant messenger, etc.

The system/UI may be configured to allow a user to view (if this information is available) (e.g., in a row below Top 10 trending songs of the day) the top song on each available streaming platform, namely YouTube Music, Spotify, Gaana, Jiosaavn, Amazon Music, Apple Music, Tidal, Deezer, Melon, and SoundCloud, etc.

The system may be configured to allow a user to (a) switch with a single touch of a button/icon, between the user's personal network and platform—wide lists of trending songs organized by genre, e.g., pop, rock, hip-hop, reggaeton, electronica, jazz, and classical, (b) view streaming information (e.g., name of song, date and time of stream, and location of stream) either in user's personal feed or on platform's geographical information systems (GIS) maps. The system may be configured to allow a user to select different map views with the touch of a button on the app's toolbar, e.g., to see the streaming information on GIS maps in different scales: countries, states/provinces, cities/towns/suburbs, and possibly neighborhoods.

The system may be configured to track each song and number of times platform users stream it on any streaming service anywhere in the world.

The system may be configured to allow a user to enter a platform specific competition to promote a song, e.g., to make a non-English song go viral in English-language music markets.

The system may be configured to allow a user to organize a campaign, e.g., to promote a non-English hit song in English-language markets. The user may be periodically notified (1) of the number of times a song has been streamed on a specific streaming platform(s) starting from the date user's promotion campaign began, (2) of competition standings, e.g., how many streams the promoted song is receiving on the platform(s) compared to songs promoted by other platform social networks.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein.

Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc, laser disc, optical disc, digital versatile disc, floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for identifying hit songs in a user's native language and promoting these songs, across cultures, in multiple languages, comprising:

creating a user account for a first user on a platform, the user account comprising profile information for the first user, including language preference, wherein the first user is associated with a first geographical location, wherein the first geographical location is associated with a first language;

creating a social network for the first user, the social network configured to allow the first user to share content with a second user in the social network, wherein a characteristic of the social network is one or more shared ethnicities between the first user and the second user, wherein the second user is associated with a second geographical location distinct from the first geographical location, wherein the second geographical location is associated with a second language;

linking at least one music streaming account to the user account through one or more application programming interfaces;

tracking a number of times a media content is streamed by the at least one linked music streaming account of the first user on a first consumer device and linked music streaming accounts of other users of the platform, wherein the media content is associated with the first language;

determining a trending media content based on the tracking by auto-populating and ranking a social network list of a plurality of media content based on the number of times each media content is streamed by members of the social network;

causing displaying of an indication of the trending media content on a second consumer device associated with the second user, wherein the at least one music streaming account is a third-party streaming service linked to the platform, and the social network is configured to allow the first user to communicate directly with the second user on the platform.

2. The method of claim 1, wherein the streaming media content includes at least music, songs, and podcasts.

3. The method of claim 1, wherein the at least one linked music streaming account comprises a plurality of domestic and foreign streaming accounts, and the foreign streaming account is defined as content presented in languages other than a user's native language, and the trending media content is determined based on a media content's popularity by tracking and tallying the number of times users of the platform stream content on a plurality of linked domestic and foreign streaming music services, wherein the first geographical location corresponds to a first country and the second geographical location corresponds to a second country distinct from the first country, wherein the first language comprises a domestic language and the second language comprises a foreign language.

4. The method of claim 3, further comprising continuously ranking streamed media content in defined charts for users and their individual social networks, wherein the continuously ranking of the streamed media content comprises tracking each song and a number of times users stream each song on one or more streaming services, and causing a user to view: a daily list of songs ranked by the number of times each song is streamed by members of a personal social network of the user; a weekly list of songs ranked by the number of times each song is streamed by the members of the personal social network of the user; a monthly list of songs ranked by the number of times each song is streamed by the members of the personal social network of the user; and an annual list of songs ranked by the number of times each song is streamed by the members of the personal social network of the user.

5. The method of claim 3, further comprising automated tallying of streamed media content by members of all social networks created on the platform, wherein the streams take place concurrently or asynchronously on a plurality of foreign and domestic streaming services that users link to the platform, collecting and collating all streaming data into a collective, platform-specific chart, wherein the collecting and collating comprises collating data from individual social networks to create a platform-wide chart ranking songs by a number of streams.

6. The method in claim 1, wherein a title of the streamed media content is displayed in a plurality of languages, including English, Hindi, Punjabi, Urdu, Spanish, French, Swedish, South Korean, Japanese, Arabic, Russian, and Chinese.

7. The method of claim 1, comprising creating, collecting, and storing unique biographical data constellations for each user of the platform, including, nationality, citizenship, age, gender, level of education, music preferences, and preferred languages.

8. The method of claim 1, comprising collecting and storing proprietary metadata constellations for each streamed media content, including locations of stream, where the users stream the media content and the time of day the media content is streamed, wherein the location includes continents, nations, regions, provinces/states, cities/towns/suburbs/unincorporated areas, and neighborhoods.

9. The method of claim 5, further comprising a continuously auto-updated display of users' collated stream counts, including songs' metadata constellations, on individual user dashboards, and on the invention's collective dashboard, wherein a non-premium user has access to song rankings based on the number of streams by members of a personal social network of the non-premium user, wherein a premium membership grants a user access to an auto-updated chart, wherein the auto-updated chart ranks songs based on total cumulative streams by all users of the platform.

10. The method of claim 5, further comprising the display of users' streaming data, and music and podcast metadata, on auto-updating, interactive maps offering a plurality of perspectives that users can click through—these perspectives including global, national, regional, and local views, wherein the display comprises allowing a user to view streaming information comprising a name of a song, a date and time of a stream, and a location of the stream on a geographical information system map, wherein the user is allowed to select different map views of the geographical information system map to see the streaming information on the geographical information system map in different scales comprising countries, states, cities, and neighborhoods.

11. The method of claim 1, comprising introducing songs from native markets into foreign markets and promoting the songs' popularity in foreign markets through a machine-learning recommendation engine, wherein the machine-learning recommendation engine recommends songs based on streams by members of the social network created expressly to share music-listening experiences.

* * * * *